Oct. 21, 1958 H. L. HUBBARD 2,857,120
FORCE PRODUCER AND CENTERING MECHANISM
Filed Feb. 25, 1955 3 Sheets-Sheet 1

Herbert L. Hubbard,
INVENTOR.

BY Herbert E. Metcalf
Patent Attorneys

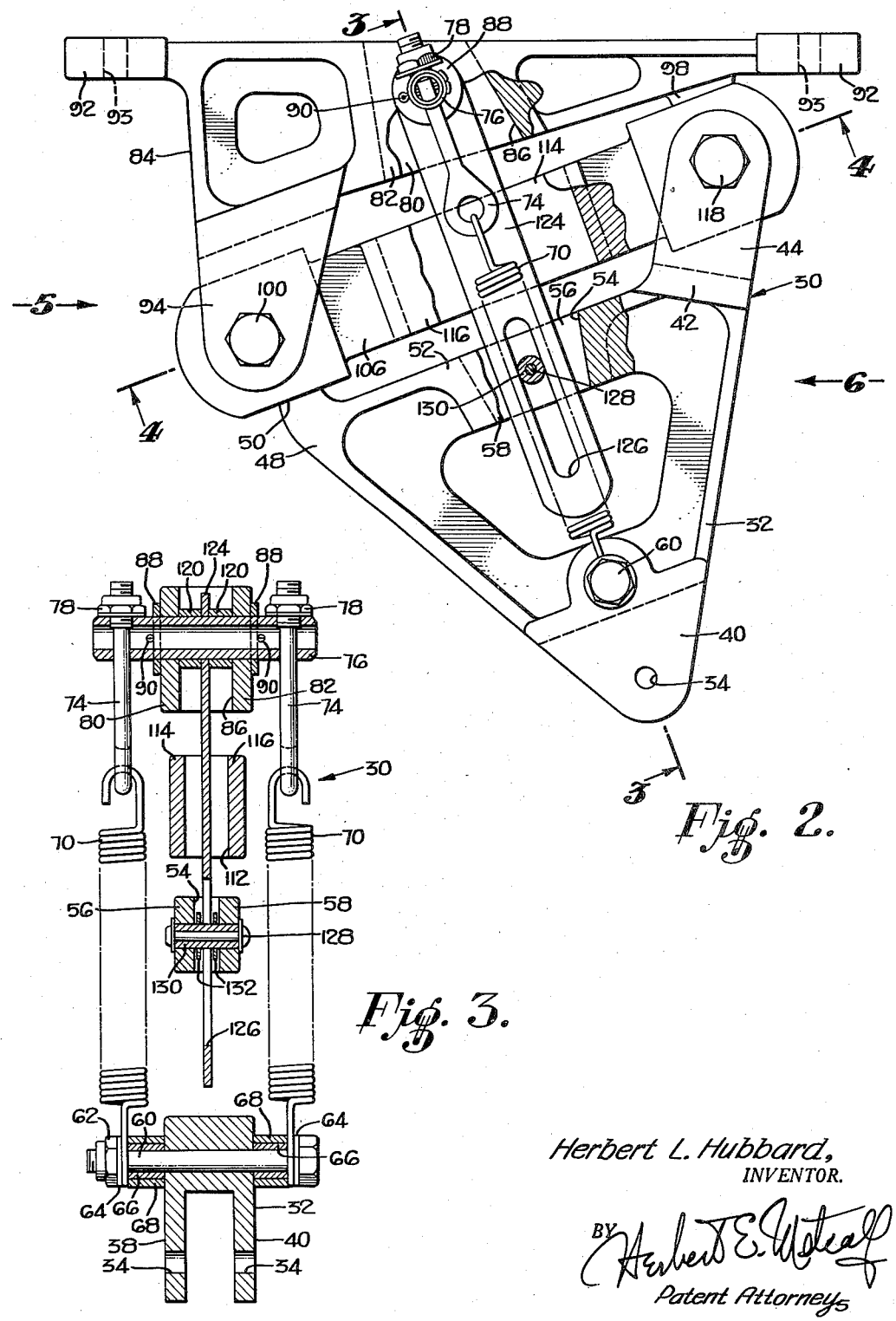

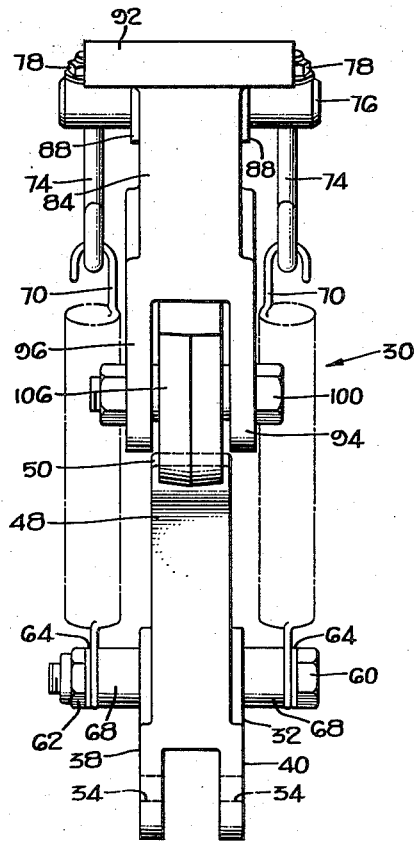
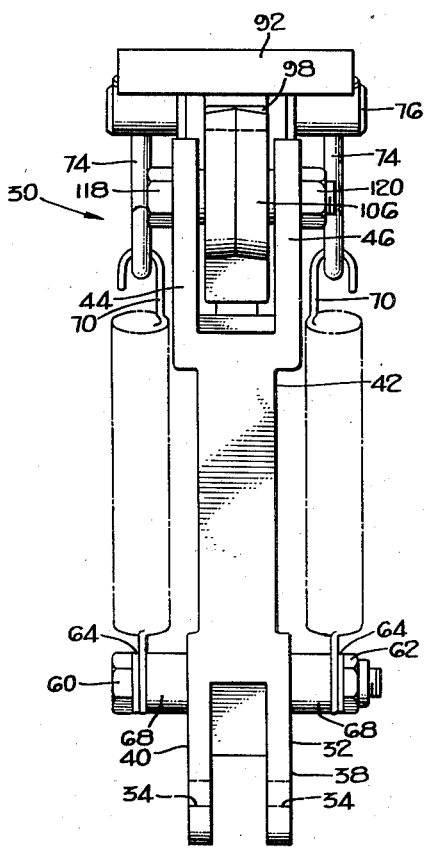

United States Patent Office 2,857,120
Patented Oct. 21, 1958

2,857,120

FORCE PRODUCER AND CENTERING MECHANISM

Herbert L. Hubbard, Inglewood, Calif., assignor to Northrop Aircraft, Inc., Hawthorne, Calif., a corporation of California Application February 25, 1955, Serial No. 490,490

4 Claims. (Cl. 244—83)

The present invention relates to controls for aircraft, and more particularly to improved means for centering and returning such controls to predetermined neutral positions.

Under optimum flight conditions, the control surfaces of an aircraft are designed to be in their neutral positions, but due to the many variables occurring in flight, such as wind gusts, direction changes, propeller adjustments as well as other reasons, it is necessary to alter the positions of these surfaces.

Further, modern high speed aircraft have, incorporated into the control system, automatic equipment that makes the changes in the control surfaces as a result of the pilot's manual input being transmitted thereinto. This automatic system, in the absence of suitable equipment, removes the pilot's "feel" for the attitude of the aircraft and as a result difficulty is experienced in returning the manual as well as the actuated controls to the exact neutral position or to the position they were in before being altered.

Therefore, included with the automatic controls was a synthetic or artificial method of transmitting the pilot's "feel" for the attitude of the aircraft. However a positive method of returning a control system to the neutral position, under the automatic control condition, has not heretofore been adequately developed.

Therefore, the principal object of this invention is to provide a force producer centering mechanism that positively returns a control system to the neutral or trim position while at the same time providing a synthetic "feel" for the pilot.

A yet further object of this invention is to provide a force producer centering mechanism that will have a minimum of backlash.

A still further object of this invention is to provide a force producer centering mechanism with very low operating friction under all extreme operating temperatures and conditions.

A still further object of this invention is to provide a force producer centering mechanism that has incorporated as a part thereof safety structure that protects the aircraft against malfunction in the event such occurs.

Figure 2 is an enlarged, fragmentary view illustrating and having embodied therein the present invention, parts being broken away for purposes of orienting certain structure relative to other mechanism and for purposes of obtaining clarity.

Figure 3 is a cross-sectional view taken on line 3—3 in Figure 2 looking in the direction indicated.

Figure 5 is a side elevation view looking in the direction of the arrow found in Figure 2 and identified by the numeral 5.

Figure 6 is a side elevation view, opposite to Figure 5, looking in the direction of the arrow found in Figure 2 and identified by the numeral 6.

Figure 1:
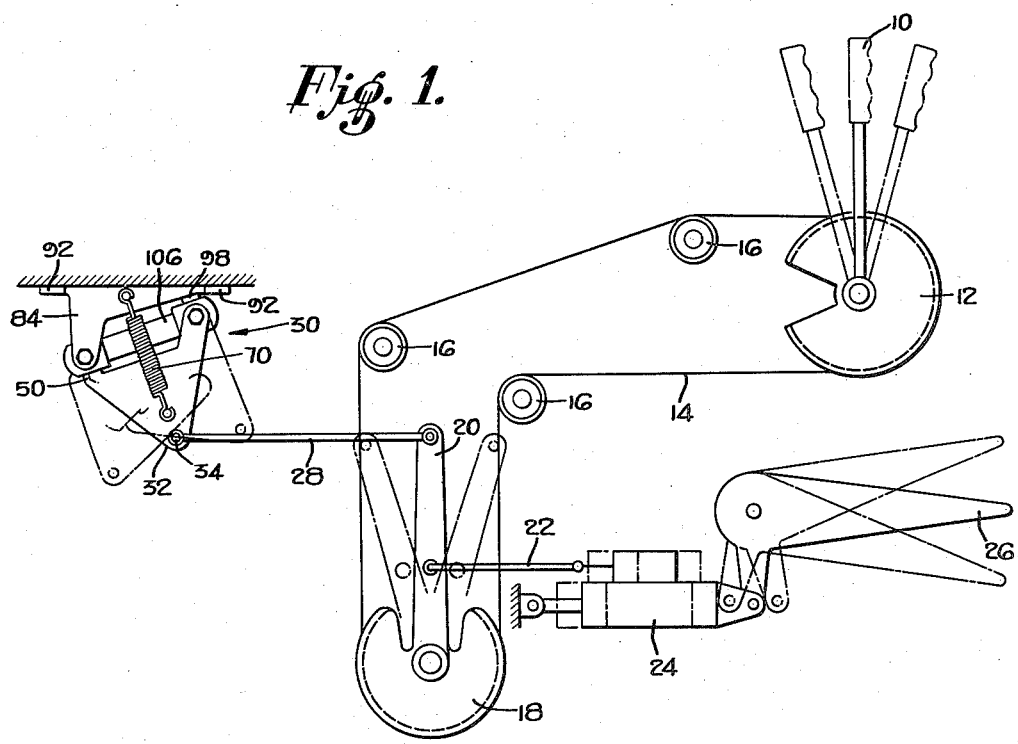
Figure 1 is a schematic view illustrating an automatic control system, having embodied therein the present invention, certain structure being shown in dotted line for purposes of illustrating their various positions under altering flying conditions.

Referring to the drawings for a more detailed description of the present invention, 10 designates a pilot's control stick mounted on a rotatable quadrant 12 over which an endless cable 14 is threaded. As may be determined by referring to Figure 1 of the drawings, the cable 14 is also threaded over other rotatable quadrants 16 and finally remote from quadrant 12, cable 14 is threaded over a last rotatable quadrant 18. The last mentioned quadrant 18 has attached thereto an elongated arm 20. Pivotally secured intermediate the ends of the arm 20 is one end of an elongated push rod 22 which is also pivotally secured, by the opposed end, to a hydraulic control valve 24. Attached to the control valve and actuated thereby, due to pilot's manual input, is the control surface 26. Pivotally secured to the free end of arm 20 and to the centering mechanism broadly designated 30 is another elongated push rod 28.

The push rod 28 is more particularly pivotally secured at one end to a triangular shaped plate 32 at point 34 located in the apex 36 thereof. The apex is bifurcated to present a pair of spaced apart, parallel legs 38 and 40 through each of which is an opening, previously designated by the point of pivot 34. Projecting from another apex 42 of plate 32 is a bifurcated projection presenting a pair of spaced apart parallel legs 44 and 46. Located on the third apex 48 of plate 32 is a stop projection 50. Formed in leg 52 is slot 54, the walls 56 and 58 of which have an opening therethrough.

Spaced from pivot point 34 toward leg 52 is an opening through which extends an elongated bolt 60, retained in position by a nut 62 threaded thereon. Located in abutting relationship with the nut 62 and the head of the bolt are washers 64 and located between each washer 64 and each side 38 and 40 on bolt 60 are bushings and spacers 66 and 68 respectively.

Secured to each end of the bolt 60 between each washer 64, bushing 66 and spacer 68 is one end of a compression spring 70. The end of the springs 70 in opposed relationship to the bolt 60 is hooked in the eye of an eye bolt 74.

The eye bolt 74 in turn extends through an opening in hollow shaft 76 and has threaded on the end thereof a nut 78 for the purpose of adjusting the tension imposed on the springs 70.

The shaft 76 extends through openings in walls 80 and 82 of a triangular shaped base 84; the walls 80 and 82 being provided as a result of a slot 86 being formed in the base 84. Disposed on and adjacent each end of the shaft 76 and between the walls 80 and 82 and the nuts 78 are washers 88 held in place by cotter keys 90.

The force producer centering mechanism 30 is secured to the aircraft by the triangular shaped base 84 which has a pair of spaced apart feet 92 integral therewith through which extend openings 93 for receiving bolts, or other equally applicable structure, for attaching base 84 to the aircraft. Also integral with base 84 is a bifurcated projection presenting a pair of spaced apart, parallel legs 94 and 96, and in opposed relation of legs 94 and 96 is a stop projection 98.

Figure 4:
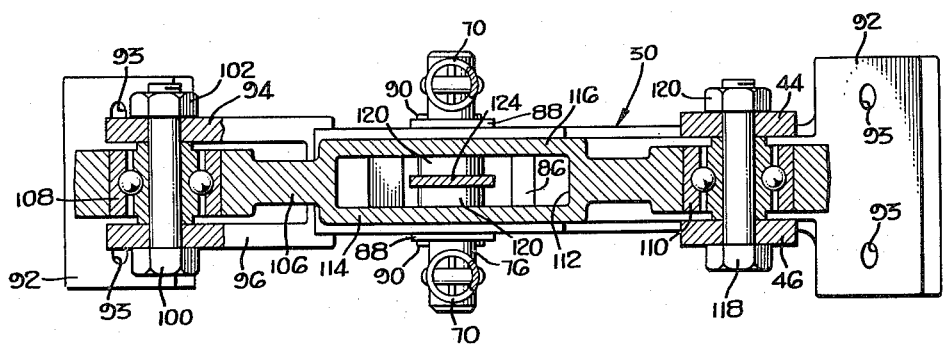
Figure 4 is a cross-sectional view taken on line 4—4 in Figure 2 looking in the direction of the arrows.

Pivotally secured between legs 94 and 96 by a bolt 100 extending through an opening in each of the legs, the bolt being retained in place by a nut 102, is an elongated link 106. The bolt 100 also extends through a ball bearing 108 pressed into the link 106 as may be determined by referring to Figure 4 of the drawings. Also pressed into link 106 in opposed relation to bearing 108 is another ball bearing 110 and formed in the link 106 between each bearing 108 and 110, in linear alignment with slots 54 and 86, is a slot 112 defined by walls 114 and 116.

That end of the link 106 having bearing 110 therein is received between legs 44 and 46 and is held in position by a bolt 118 having a nut 120 thereon in a manner similar to that end of the link having bearing 108 therein.

Extending through each of the slots 54, 86 and 112, rotatably secured to the shaft 76 and equally spaced from walls 80 and 82 by spacers 120, is an elongated stop bar 124. Constructed in stop 124 adjacent its free end and extending toward shaft 76 is an elongated slot 126 through which extends a pin 128 that is retained, in the aforementioned opening, in walls 56 and 58 of plate 32. Secured on the pin 128 is a bushing 130. Disposed on each side of and between the stop 124 and walls 54 and 58 are washers 132.

The operation of the invention is as follows: Assume that the nuts 78 on eye bolt 74 are adjusted to preload the springs 70 when the device is in the full line position illustrated in Figure 1 of the drawings. This preloading eliminates backlash.

When the pilot wishes to alter the attitude of the aircraft by causing the control surface to go down, as it is viewed in Figure 1 of the drawings, he moves the control stick 10 to the right. This movement is transmitted through the cable 14 and quadrants 12, 16 and 18 to arm 20. From arm 20 the movement is transmitted to the hydraulic valve 24 via push rod 22 and triangular plate 32 via push rod 28. The arm 20 as well as the plate 32 moves to the right as indicated by the dotted line position. This movement of plate 32 results in the same pivoting about bolt 118 in the manner illustrated by dotted lines in Figure 1 of the drawings. As the triangular plate 32 is pulled through its arcuate path of travel and the pivot point 34 of push rod 28 is displaced, the force in the springs 20 increases but the moment arm of force about bolt 118 decreases. When the pilot wishes to return the elevators to neutral or trim position the springs 70 will pull the plate 32 back and as a result the arm 20 through push rod 28 will be returned to the full line position. This change of arm 20 will be conveyed through the hydraulic valve 24 via push rod 22 to the control surface. When plate 32 reaches its neutral or trim position, stop 50 integral therewith contacts link 106 and is prevented from any overtravel. This same result would occur if the pilot of the aircraft were to release the control 10 from his grasp.

If the control stick 10 were to be moved to the left, as viewed in Figure 1 of the drawings, the arm 20 would assume a similar position, but the plate 32 as well as the link 106 would pivot about bolt 100. In other words the plate 32 would be urged into the position illustrated in Figure 2 of the drawings and that coupled with the link 106 would be urged to the dotted line position illustrated in Figure 1 of the drawings. In all other respects, the results would be identical to those described for the operation of the plate 32 alone.

Further in the event that either one or both of the springs 70 suffers from malfunction the plate 32 and link 106 are prevented from extensive movement due to the stop bar 124. The limit of authority, under malfunction conditions of plate 32 or the link 106 is restricted by the the length of the slot 126 and the pin 128 extending therethrough. It may be seen that even though the force producer centering mechanism 30 is not operable, this result does not make inoperable the control system of the aircraft. The hydraulic valve 24, stick 10 and all structure between is still able to function.

Attention is directed to the fact that the objects set forth have been fulfilled by the description and operation of the invention.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In the control system of an aircraft having control surfaces that rotate about an axis, hydraulic control valves actuated by a control stick for reciprocating said surfaces, a force producer and centering mechanism for the control system comprising a base secured to the aircraft; a plate pivotally attached to said control system; a link between said control valves and control stick; a link rotatably attached to said base; said plate is rotatably attached to said second mentioned link; and resilient means on said base and said plate that spans the distance therebetween, and urges said plate and said link toward said base in opposition to the force exerted on the control stick.

2. In the control system of an aircraft having control surfaces that rotate about an axis, hydraulic control valves actuated by a control stick for reciprocating said surfaces, a force producer and centering mechanism for the control system comprising a base secured to the aircraft; a plate pivotally attached to said control system; a link between said control valves and control stick; a link rotatably attached to said base, between the latter and said plate and to which is rotatably attached said plate; resilient means on said base and said plate that spans the distance therebetween, and urges said plate and said link toward said base in opposition to the force exerted on the control stick; and a stop bar on said base and plate that limits the rotation of said link and plate in the event of failure of said resilient means.

3. In the control system of an aircraft having control surfaces that rotate about an axis, hydraulic control valves actuated by a control stick for reciprocating said surfaces, a force producer and centering mechanism for the control system comprising a base secured to the aircraft; an elongated link one end of which is rotatably attached to said base; a plate rotatably attached to said link on that end thereof in opposed relationship to that end of the link attached to said base; said plate being pivotally attached to said control system between said control stick and control valve; a stop on said plate that limits the rotation thereof in one direction; said stop being adjacent the point of rotation of said link; and resilient means on said base and said plate, that spans the distance therebetween, and urges said plate and said link toward said base in opposition to the force exerted on the control stick.

4. In the control system of an aircraft having control surfaces that rotate about an axis, hydraulic control valves actuated by a control stick for reciprocating said surfaces, a force producer and centering mechanism for the control system comprising a base secured to the aircraft; an elongated link one end of which is rotatably attached to said base; a plate rotatably attached to said link on that end thereof in opposed relationship to that end of the link attached to said base; said plate being pivotally attached to said control system between said control stick and control valve; a stop on said plate that limits the rotation thereof in one direction; said stop being adjacent the point of rotation of said link; a stop bar on said base and plate that limits the rotation of said link and plate in the event of failure of said resilient means.

References Cited in the file of this patent

UNITED STATES PATENTS

| 2,436,897 | Nutt | Mar. 2, 1948 |
| 2,528,752 | Jacobus | Nov. 7, 1950 |
| 2,604,657 | Tipper | July 29, 1952 |
| 2,797,882 | Servanty | July 2, 1957 |

FOREIGN PATENTS

| 588,739 | France | Feb. 6, 1925 |